United States Patent Office 2,791,119
Patented May 7, 1957

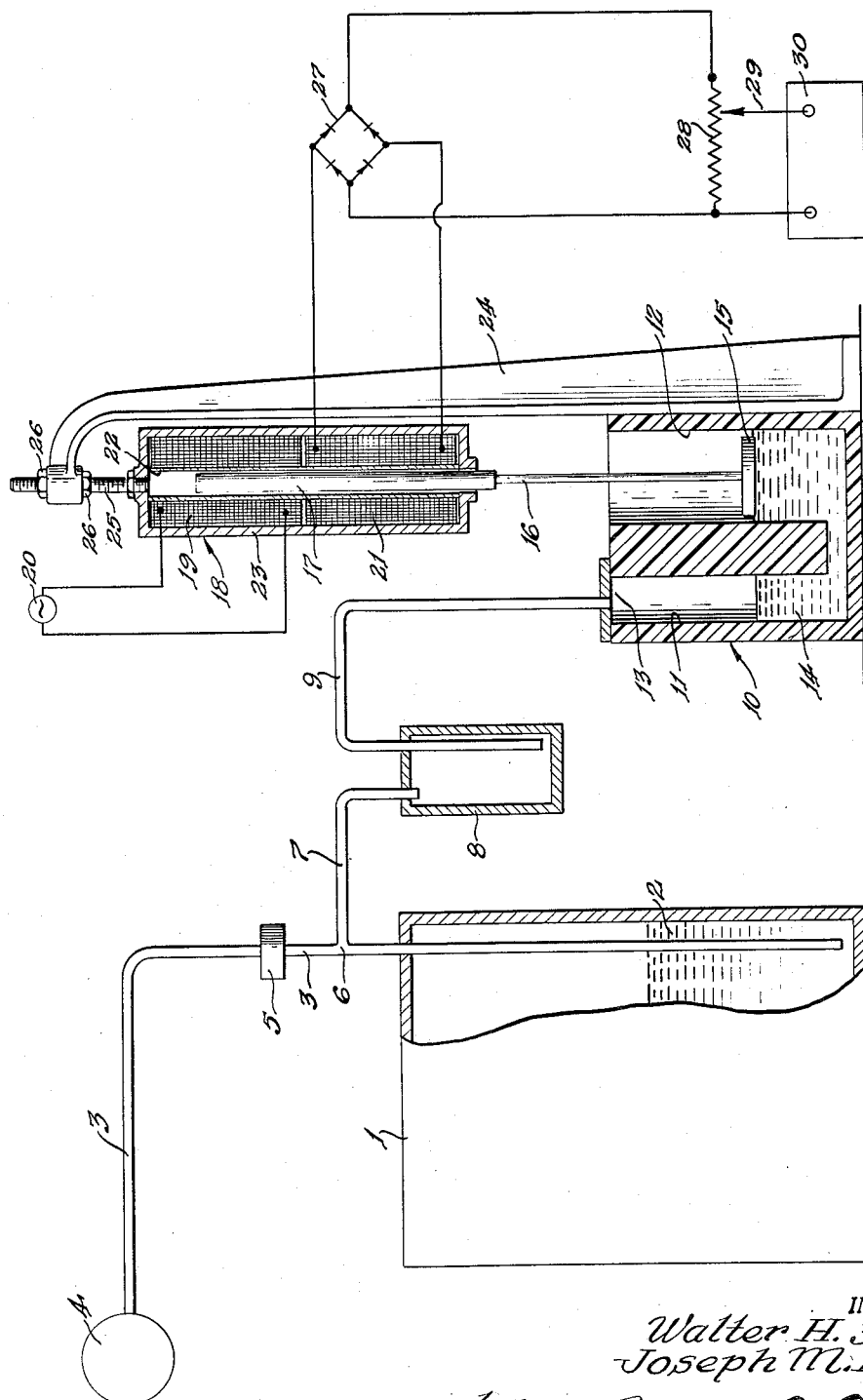

2,791,119
LIQUID LEVEL INDICATOR

Walter H. Zinn, Hinsdale, and Joseph M. Harrer, Elmhurst, Ill., assignors to the United States of America as represented by the United States Atomic Energy Commission Application March 28, 1956, Serial No. 574,567

1 Claim. (Cl. 73—301)

This invention relates to a device by which the level of a liquid in a tank may be measured, and particularly to a device by which a liquid level may be indicated or recorded at a distance from the tank.

A particular problem in this connection arises in measuring the amount of liquid in a storage tank where the liquid is used as coolant and/or moderator in a nuclear chain reactor. Piping and equipment carrying this liquid must be isolated to protect personnel against radiation and to guard the equipment against unauthorized manipulation. Therefore a direct measurement cannot be made.

It is an object of the invention to provide a device for measuring the level of a liquid in a closed tank, thus obtaining an indication of the amount of liquid in the tank.

It is a further object of the present invention to provide a liquid level indicating device which produces an indication of the level of the liquid at a remote location.

Reference is now made to the drawing which comprises a diagrammatic representation of a liquid level indicating system according to the present invention.

In the drawing a tank 1 holds a body 2 of liquid. The amount of this liquid is to be constantly measured and indicated or recorded at a distance from the tank. A gas supply line 3 extends between a source of compressed gas 4 and a point near the bottom of tank 1. A bubble type flow meter 5 is inserted in gas supply line 3 to indicate at a glance whether gas is passing through the line at a constant flow rate.

The gas supply line 3 is branched at 6 and a branch line 7 leads to a point near the top of a closed container 8 forming a mercury trap from a point near the bottom of which a line 9 leads to U-shaped conduit 10 which is formed with legs 11 and 12 of unequal diameter. The line 9 communicates with the U-shaped conduit 10 in the closed upper portion 13 of leg 11 which is the smaller in diameter of the two legs. The U-shaped conduit 10 has a body of mercury 14 or other heavy liquid contained therein.

The mercury trap 8 is provided to catch mercury from the conduit 10 should an accidental suction on the line 9 draw the mercury out of the U-shaped conduit 10. Leg 12 of the U-shaped conduit 10 is open to the atmosphere. It is large enough to hold all the mercury in the conduit so that mercury cannot be lost through the open end of leg 12. Leg 12 contains a float 15 which rests on the top of the mercury contained in this leg of the conduit. The float 15 is rigidly attached by means of rod 16 to a cylindrical body 17 of a magnetic material which forms the core of a transformer 18. Transformer 18 includes a primary coil 19 which is connected to a source of alternating current 20 and a secondary coil 21. A change in the position of the core 17 within the transformer 18 will result in a change in the current induced in the secondary coil 21 from the primary coil 19. The primary coil 19 and secondary coil 21 are jointly mounted on a glass sleeve or bushing 22 which has an internal diameter sufficient to permit free axial movement of the core 17.

A housing 23 for the transformer 18 is provided which is adjustably mounted on support 24 in any convenient fashion, as by threaded member 25 and nuts 26. The adjustment can easily be made by screwing one of the nuts 26 away from the support 24, moving the support toward it, and tightening up the other nut 26. Adjustment of the housing 23 in a vertical direction adjusts the location of the coils of the transformer with respect to the core of the transformer for a purpose to be described hereinafter.

The secondary coil 21 of the transformer is connected to a full wave rectifier 27. The direct current taken off from this rectifier 27 passes through a variable resistance 28 by way of a tap 29 to a microvolt indicator 30 which may be calibrated so that the level of the liquid can be read directly, or a conversion table can be used.

A specific embodiment of the invention as applied to the measurement of the height of $D_2O$ in a supply tank for a neutronic reactor will now be described. As the $D_2O$ is used in a reactor an inert gas such as helium is used. Helium is therefore passed into tank 1 from the source of compressed gas 4 and the amount of gas is adjusted so that the gas just bubbles through the $D_2O$ when the tank 1 is full. As the gas supply line 3 is connected to the leg 11 of U-shaped conduit 10, the gas also exerts pressure on the mercury contained therein. This U-shaped conduit may be formed as a U-shaped cavity in a solid block of a transparent methacrylate resin such as "Lucite." The pressure exerted on the mercury by the gas is dependent on the height of the $D_2O$ in the tank 1, and variation in the pressure exerted on the mercury changes the height of the mercury in the leg 12 of the U-shaped conduit.

In the specific embodiment described, provision is made for a tank containing up to five feet of $D_2O$. The diameter of leg 11 of the U-shaped conduit 10 may be about one inch and the diameter of leg 12 may be about two inches. A five foot difference in level of the $D_2O$ will be translated into approximately a one inch difference in level of the mercury in the leg 12.

The float 15 may consist of a thin disk of such a material as a transparent methacrylate resin such as "Lucite" so that it is not top heavy. Change in the position of this disk changes the location of the core 17 in the transformer 18. The current in the secondary coil 21 of the transformer therefore varies with changes in the height of the mercury in leg 12 of the U-shaped conduit 10, and an electrical indicator 30 responsive to the variation in the induced current in the secondary coil of the transformer will give an accurate indication of the amount of $D_2O$ in the tank 1.

To adjust the indicator the tank 1 is emptied of liquid and helium is passed thereinto. The location of the transformer housing, and therefore the location of the coils 19 and 21, with respect to the core 17 of the transformer, is then adjusted to obtain a zero setting on the indicator. After the zero setting is obtained, the tank is filled with $D_2O$, helium is passed thereinto, and the tap 29 on the variable resistance 28 is adjusted so that a full scale reading on the indicator 30 is obtained.

It will be understood that this invention is not to be limited to the details given herein but that it may be modified within the scope of the appended claim.

What is claimed is:

A device for measuring remotely the height of a body of liquid comprising, in combination, a U-shaped conduit partially filled with mercury, gas supply means including a source of compressed gas, a line extending between the source of compressed gas and a point within the body of liquid adjacent the bottom thereof, a closed container serving as a mercury trap, a branch line extending between the first-mentioned line and a point adjacent the top of said closed container, and a line extending between a point adjacent to the bottom of the closed container and one leg of the U-shaped conduit, a float formed in the shape of a thin disk disposed in the other leg of the U-shaped conduit resting on the mercury contained therein, said legs of the U-shaped conduit being of unequal diameter, the leg containing the float being larger in diameter than the first-mentioned leg, a transformer comprising a primary coil and a secondary coil located above the float, an axially movable magnetic core for the transformer, a rigid connection between the magnetic core and the float whereby movement of the float likewise moves the magnetic core and results in variation in the induced current in the secondary of the transformer, means for adjusting the axial relationship of the coils and the core of the transformer, a full wave rectifier connected to said secondary coil of said transformer, an electrical indicator, and an adjustable resistance in series between said full wave rectifier and said electrical indicator whereby a remote indication of the liquid level of the body of liquid is obtained.

References Cited in the file of this patent
UNITED STATES PATENTS

| | | |
|---|---|---|
| 1,821,958 | Beecher | Sept. 8, 1931 |
| 1,891,155 | Harrison | Dec. 13, 1932 |
| 2,026,299 | Boyd | Dec. 31, 1935 |
| 2,050,629 | Quereau | Aug. 11, 1936 |